(12) United States Patent
Burnside et al.

(10) Patent No.: US 6,862,851 B2
(45) Date of Patent: Mar. 8, 2005

(54) MOUNTING ASSEMBLY FOR VEHICLE PANELS

(75) Inventors: Phillip H. Burnside, Plant City, FL (US); Julia G. Bernas, Leechburg, PA (US); William R. Siskos, Delmont, PA (US); Robert N. Pinchok, New Kensington, PA (US); Mark K. McLure, Lower Burrell, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 40 days.

(21) Appl. No.: 10/190,971

(22) Filed: Jul. 8, 2002

(65) Prior Publication Data

US 2003/0024183 A1 Feb. 6, 2003

Related U.S. Application Data

(60) Provisional application No. 60/305,056, filed on Jul. 13, 2001.

(51) Int. Cl.$^7$ .............................................. E06B 3/964
(52) U.S. Cl. ................. 52/204.66; 49/397; 296/146.16; 296/92
(58) Field of Search ..................... 52/204.66, 786.12; 49/397, 398, 381, 340; 296/92, 146.16; 220/845, 244, 810; 403/408.1; 312/257.1, 138.1

(56) References Cited

U.S. PATENT DOCUMENTS

| 5,440,849 | A | 8/1995 | Agrawal et al. ............... 52/393 |
| 5,475,956 | A | 12/1995 | Agrawal et al. ............... 52/208 |
| 5,544,458 | A | 8/1996 | Fisher et al. ............ 52/204.591 |
| 5,551,197 | A | 9/1996 | Repp et al. ............... 52/204.62 |
| 5,704,173 | A | 1/1998 | Repp et al. ............... 52/204.62 |
| 5,756,185 | A | 5/1998 | Lesser ......................... 428/192 |
| 5,853,895 | A | 12/1998 | Lewno ..................... 425/425.6 |
| 5,966,874 | A | 10/1999 | Repp et al. .................... 49/398 |
| 6,151,834 | A | * 11/2000 | Oami et al. .................... 49/402 |

FOREIGN PATENT DOCUMENTS

DE        3347798 A1  * 10/1985   ................... 49/402

* cited by examiner

Primary Examiner—Naoko Slack
(74) Attorney, Agent, or Firm—Andrew C. Siminerio

(57) ABSTRACT

A mounting assembly comprises a mounting member comprising a base having a first surface; a central portion extending from the base and having a second surface spaced from the base; and a shoulder region located between the base and the central portion. The area of the first surface may be different from the area of the second surface. The shoulder region of the mounting member can include a wall extending from at least in close proximity to the second surface of the central portion to the base. In a nonlimiting embodiment of the assembly, the base is cylindrically shaped with a substantially flat first surface, the second surface of the central portion is substantially flat and substantially circular in plan view and further is concentric with the first surface, and the wall extends from the second surface to a location inboard of the periphery of the base.

33 Claims, 5 Drawing Sheets

MOUNTING ASSEMBLY FOR VEHICLE PANELS

CROSS-REFERENCE TO RELATED APPLICATION

This application claims the benefits of U.S. Application Ser. No. 60/305,056 filed Jan. 13, 2001, which is herein incorporated by reference in its entirety.

BACKGROUND OF THE INVENTION

1. Field of the Invention

This invention relates generally to mounting assemblies and, more particularly, to a mounting assembly for mounting a vehicle panel, such as a vision panel, to a vehicle.

2. Description of the Current Technology

Automobile manufacturers are attempting to make automobiles more aerodynamic and streamlined to reduce wind resistance and to increase fuel efficiency. One streamlining technique is to use vision panels, such as rear or side windows or transparencies, which conform to the streamlined body shape of the automobile. This streamlining technique is relatively easy for stationary windows that can simply be sealed into the vehicle body. However, the incorporation of hinged or so-called "flip-out" windows that conform to the vehicle shape in the closed position but that can be flipped-open to allow air to flow into the vehicle presents some problems. For example, these flip-out windows are typically mounted on the vehicle by a mechanical mounting assembly having a bolt that extends through a hole drilled through the window. The outer portion of the bolt extending through the window reduces the aerodynamic efficiency of the vehicle shape. Additionally, the glass window panels can be broken or damaged during the hole drilling process or during attachment of the mounting assembly hardware to the window. While sophisticated drilling techniques have been developed to reduce window damage, these drilling techniques increase the time and cost of manufacturing.

In an attempt to alleviate this problem, mounting systems that are adhesively rather than mechanically attached to the window panel have been developed. For example, U.S. Pat. No. 5,551,197 discloses a flush-mounted articulated window assembly with a window-mounting member bonded by two separate adhesives to the inner surface of the window. U.S. Pat. No. 5,475,956 discloses a vehicle panel assembly with a sealing member molded onto the window surface and encapsulating a portion of an attachment member adhesively bonded to the surface. Examples of other adhesively mounted vehicle window assemblies are disclosed in U.S. Pat. Nos. 5,440,849; 5,544,458; 5,853,895; 5,966,874; and 5,704,173. While generally acceptable for their intended purpose, these known systems can provide some concerns. For example, some of these systems require the use of a rigid adhesive that, while strongly bonding the mounting assembly to the window, can cause damage to the window itself if sufficient stress is placed on the mounting assembly. Additionally, in systems in which the hinge element itself is adhesively bonded to the window, the hinge element cannot be easily removed for repair or replacement without damaging the window. Also, some of these mounting assemblies utilize mounting members having a relatively large surface area, which decreases the available viewing area of the window.

Therefore, it would be advantageous to provide a vehicle panel mounting assembly that reduces or eliminates at least some of the problems of conventional mounting assemblies.

SUMMARY OF THE INVENTION

The present invention provides a mounting assembly comprising a mounting member comprising a base having a first surface; a central portion extending from the base and having a second surface spaced from the base; and a shoulder region located between the base and the central portion. In one nonlimiting embodiment of the assembly, the area of the first surface is different from the area of the second surface. In another nonlimiting embodiment of the assembly, the shoulder region includes a wall extending from at least in close proximity to the second surface of the central portion to the base. In still another nonlimiting embodiment of the assembly, the base is cylindrically shaped with a substantially flat first surface, the second surface of the central portion is substantially flat and substantially circular in plan view and further is concentric with the first surface, and the wall extends from the second surface to a location inboard of the periphery of the base.

The present invention also provides a mounting assembly, comprising: a mounting member having (a) a base with a first surface, (b) a central portion extending from the base with a second surface, and (c) a shoulder region located between the base and the central portion; and a hinge member having a first end and a second end, with the first end removably attached to the first surface of the mounting member.

The present invention further provides a mounting assembly, comprising: a mounting member having a first surface and a second surface; and a hinge member having a first end and a second end, with the first end removably attached to one of the first or second sides.

The present invention provides a mounting assembly, comprising a mounting member having a first surface with a first area and a second surface with a second area different from the first area.

The present invention further provides an assembly, comprising: (a) a substrate having a first surface and a second surface; (b) a mounting member secured to the first surface of the substrate, the mounting member including a base having a first surface facing away from the first surface of the substrate, a central portion extending from the base having a second surface facing the first surface of the substrate and a substantially curved periphery, and a shoulder region located between the central portion and the base; and (c) an adhesive providing a bond between at least a portion of the second surface of the central portion and the first surface of the substrate, the adhesive extending into at least a portion of the shoulder region such that a thickness of the adhesive in the at least a portion of shoulder region is greater than a thickness of the adhesive along at least a portion of the second surface of the central portion.

DESCRIPTION OF THE PREFERRED EMBODIMENTS

Figure 1:
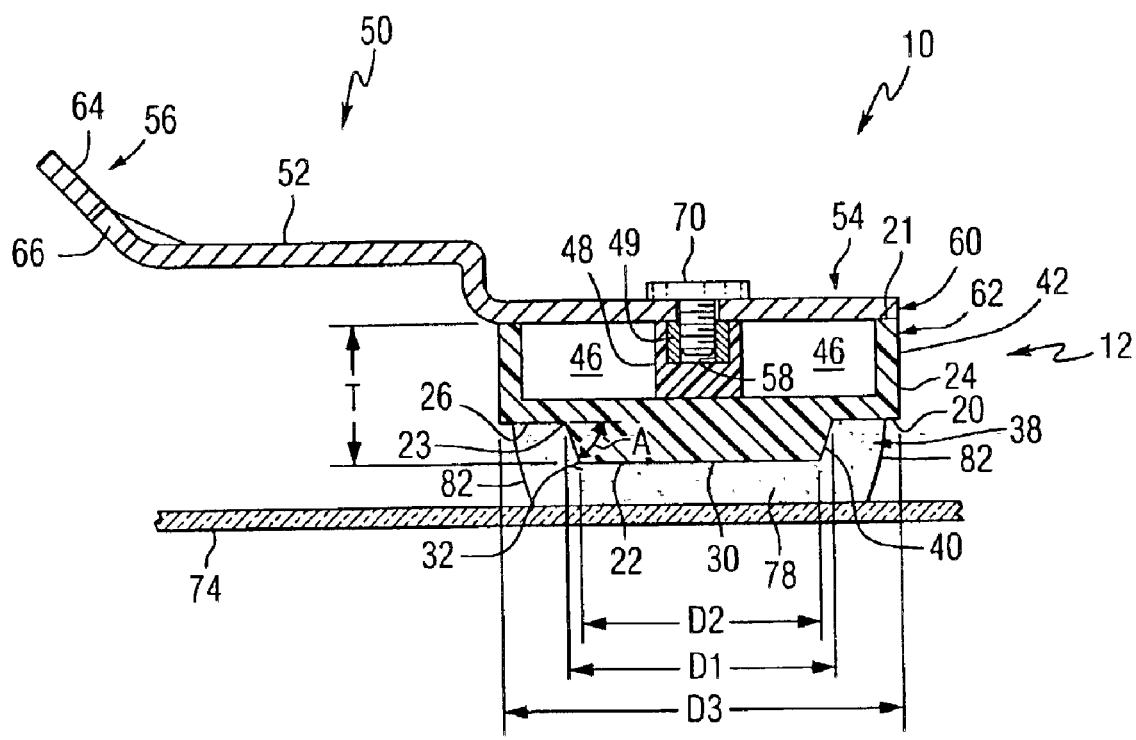
FIG. 1 is a side, sectional view (not to scale) of a vehicle panel mounting assembly of the invention showing a sectional view of a mounting member (taken along the line 1—1 of FIG. 3) attached to a vehicle panel.

As used herein, spatial or directional terms, such as "left", "right", "inner", "outer", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. The terms "flat" or "substantially flat surface" refer to an element or surface that is substantially planar in form; that is, a surface lying primarily in a single geometric plane; which surface, as would be understood by one skilled in the art, can include slight bends, projections, or depressions therein. Further, as used herein, the terms "deposited over", "applied over", or "provided over" mean deposited, applied or provided on but not necessarily in contact with the surface. For example, a coating "deposited over" a substrate does not preclude the presence of one or more other coating films of the same or different composition located between the deposited coating and the substrate.

An exemplary mounting assembly incorporating features of the invention for hingeably or pivotally mounting a vehicle window to a vehicle body will be described. However, it is to be understood that the invention is not limited to this exemplary embodiment. The invention can be used to mount or affix many different types of attachment elements (such as but not limited to hinges, clevises, latches, handles, lights, antennas, cosmetic articles, and mirrors) to a substrate of any desired type (such as but not limited to a glass substrate, a ceramic substrate or a metal substrate). For example, the substrate can be an architectural window, a skylight, a pane of an insulating glass unit, a vehicle panel (such as a windshield, side light, back light, sun roof), or an aircraft transparency, just to name a few.

Figure 2:
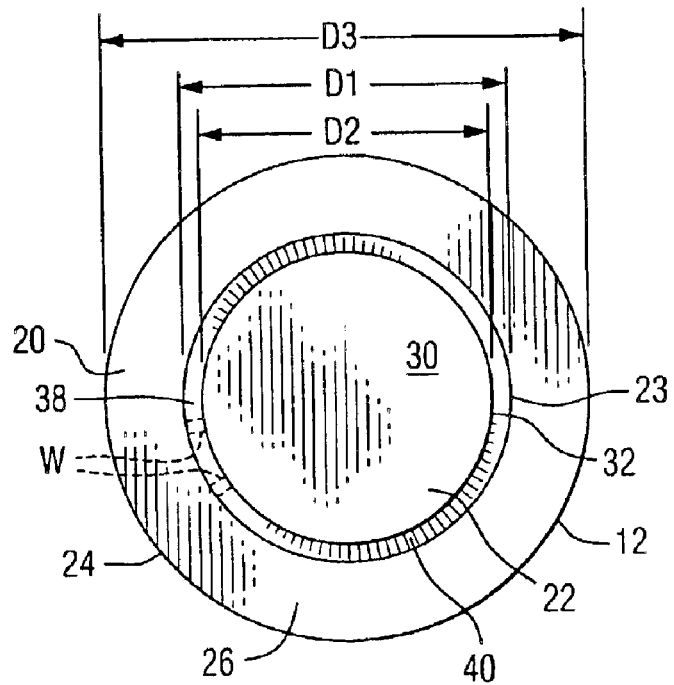
FIG. 2 is a bottom view (not to scale) of the mounting member of FIG. 1.
Figure 3:
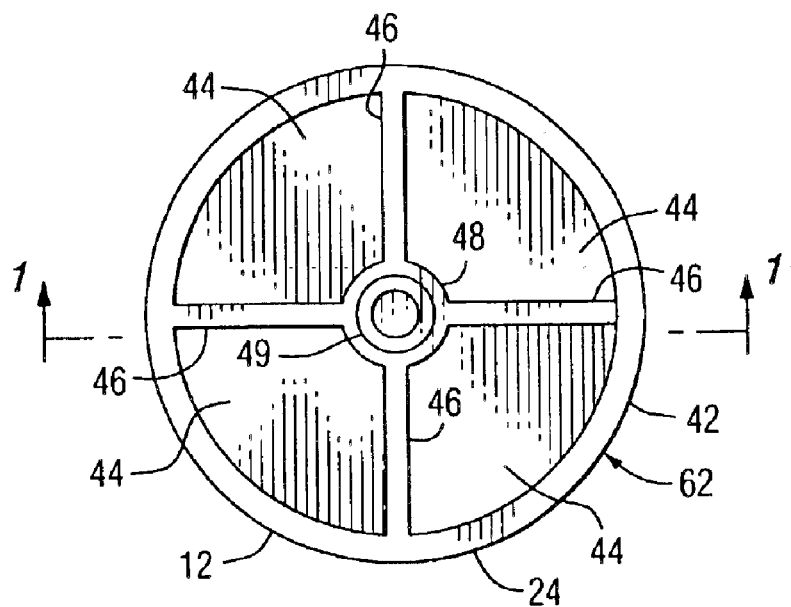
FIG. 3 is a plan view (not to scale) of the mounting member shown in FIG. 2.

As shown in FIGS. 1–3, a mounting assembly 10 of the invention includes a mounting member 12 having a base 20 and a central portion 22 projecting or extending from the base 20. The base 20 and portion 22 can be of any geometric design or shape. In the nonlimiting exemplary embodiment shown in FIGS. 1–3, the base 20 has a substantially curved outer periphery 24, such as a substantially circular outer periphery, when viewed in plan view. As used herein, the term "curved outer periphery" refers to an outer peripheral surface that does not include sharp corners or angles when viewed in plan view. Base 20 includes a first mounting surface 21 to which an attachment element is mounted and secured, as will be discussed later in more detail, and if desired, an opposing surface 26 located at the portion of the base 20 where the base 20 and central portion 22 meet, as will be discussed later in more detail.

The central portion 22 includes a second securing surface 30 that is spaced from the base 20 and to which an adhesive is applied to secure the mounting member 12 to a panel, as will be discussed later in more detail. In the nonlimiting exemplary embodiment, the surface 30 is substantially flat or planar. The surface 30 can be of any geometric shape. In the nonlimiting embodiment shown in FIGS. 1 and 2, surface 30 has a substantially curved outer periphery 32, such as a circular outer periphery, when viewed in plan view.

Although not required, in the particular nonlimiting embodiment of the invention shown in FIGS. 1 and 2, the area of surface 21 of base 20 is greater than the area of surface 30 of central portion 22. As will be discussed later in more detail, portions of the base 20 can be removed such that the actual surface area of surface 21 is reduced. As a result, as used herein, "the area of 21" means the area of the surface as if no portion of the base were removed.

With continued reference to the nonlimiting embodiment illustrated in FIG. 1, mounting member 12 further includes a shoulder region 38 having a surface or wall 40 extending between the base 20 and the central portion 22. More particularly, wall 40 extends between from at least in close proximity to surface 30 of central portion 22 to at least in close proximity to periphery 24 of base 20. In the nonlimiting exemplary embodiment illustrated in FIG. 1, wall 40 extends from surface 30 of central portion 22 to a location inboard of periphery 24 of base 20, and more specifically, to surface 26 of base 20. Although not required, the wall 40 can have a substantially flat surface that is inclined from the base 20 to the central portion 22 at an angle A ranging from 30° to 90°. In the nonlimiting embodiment of the invention illustrated in FIG. 1, angle A is 45°. However, it is to be understood that the wall 40 can be of any shape or slope. For example, in another nonlimiting embodiment the wall 40 can be of a concave or convex shape when viewed in cross-section.

In the nonlimiting embodiment shown in FIGS. 1 and 2, the shoulder region 38 extends continuously around the mounting member 12 when viewed in plan view (see FIG. 2). However, it is to be understood that in other embodiments of the invention the shoulder region 38 can be discontinuous around the periphery of the mounting member 12, such as by the inclusion of one or more discrete, spaced apart supports or walls W (shown by dashed lines in FIG. 2) that extend from the central portion 22 into the shoulder region 38 to break the shoulder region 38 into two or more separate regions when viewed in plan view.

Although not required, in one nonlimiting embodiment of the invention, base 20, central portion 22 and shoulder portion 38 are integral with each other. In another nonlimiting embodiment, base 20 is substantially cylindrical in shape. In still another nonlimiting embodiment, wherein surface 40 of shoulder region 38 is angled or tapered, the combination of shoulder region 38 and central portion 22 form a truncated conical shape. In this particular embodiment, the base 23 of the central portion 22 has a diameter D1 that is greater than the diameter D2 of surface 30. In a nonlimiting embodiment wherein the base 20 is cylindrical and central portion 22 in combination with shoulder portion 38 forms a truncated cone, the diameter D3 of base 20 is greater than diameter D1. In still another embodiment, diameter D1 equals D3, as will be discussed later in more detail.

Although not required, in one nonlimiting embodiment of the present invention, the mounting member 12 can be a solid or substantially solid member. Alternatively, as shown particularly in FIGS. 1 and 3, the mounting member 12 can be substantially hollow, e.g., can have a substantially hollow interior bounded by an outer wall 42, whose outer surface forms periphery 24. For example, in one nonlimiting embodiment, the mounting member 12 can include at least one hollow cavity 44. In the nonlimiting exemplary embodiment shown in FIG. 3, the mounting member 12 has four hollow cavities 44 separated by support webs 46, which provide structural strength to the mounting member 12. A connecting member 48, such as a sleeve having a threaded bore, can also be located within the base 20 of the mounting member 12 to facilitate connection of an attachment element to member 12, as will be discussed later in more detail.

The mounting member 12 can be of any desired material. For example and without limiting the present invention, the mounting member 12 can be made partly or wholly of plastic (such as polyacrylates, polycarbonates, and/or polyethyleneterephthalate (PET)), metal, glass, or combinations thereof. If desired, a metal fitting 49 can be positioned within member 48 to provide the threaded bore. Additionally, the mounting member 12 can be of any desired dimensions. Although not limiting to the invention, in one exemplary embodiment the base 20 of mounting member 12 has a diameter (D3) in the range of 1 to 2 inches (2.5 to 5 cm), e.g., 1.5 inches (3.8 cm); the mounting member 12 has a thickness (T) in the range of 0.5 to 1.5 inches (1.3 to 3.8 cm), e.g., 7/16 inches (1.1 cm); and the central portion surface 30 has a diameter (D2) of 0.5 to 2.5 inches (1.3 to 6.4 cm), e.g., 1 inch (2.5 cm).

In the nonlimiting exemplary embodiment shown in FIGS. 1–3, both the outer periphery 24 of the base 20 and the outer periphery 32 of the central portion 22 are curved, e.g., circular in plan view. In this embodiment, the base 20, shoulder region 38, and central portion 22 are concentric when viewed in plan view. However, it is to be understood that the invention is not limited to this particular design.

The mounting member 12 can be used to attach various attachment elements to a substrate surface. For example and without limiting the present invention, a hinge member 50 can be removably attached to the mounting member 12, as shown in FIG. 1. In one nonlimiting embodiment, the hinge member 50 includes an elongated, substantially "S" shaped piece 52 having a first end 54 and a second end 56. In one nonlimiting embodiment, piece 54 is metal. The first end 54 can include a passage or bore 58. Although not required, at least a portion of the outer periphery 60 of the first end 54 can have a curvature that is substantially the same as the curvature of the outer periphery 62 of at least a portion of base 20 of the mounting member 12. A mounting plate 64 can be located at the second end 56 of the hinge member 50 and can include one or more bores 66. The mounting plate 64 can be integral with the rest of the piece 52. The hinge member 50 can be attached to the mounting member 12 by a connecting element 70, such as a threaded screw which extends through the bore 58 in the first end 54 of the hinge member 50 and threadably engages the threaded bore 48 of the mounting member 12. Of course, other conventional methods and devices can be used to releaseably connect the hinge member 50 to the mounting member 12, such as, for example, conventional quick release devices, a bolt extending through the bore 58, or other conventional connection means.

In the broad practice of the invention, the substrate to which the mounting assembly 10 is to be attached can be of any desired material having any desired optical characteristics, such as opaque, translucent, transparent or substantially transparent substrates. For example, the substrate 12 can be transparent to visible light. By "transparent" is meant having a transmittance through the substrate 12 of greater than 0% up to 100%. By "visible light" is meant electromagnetic energy in the range of 390 nanometers (nm) to 800 nm. Alternatively, the substrate 12 can be translucent or opaque. By "translucent" is meant allowing electromagnetic energy (e.g., visible light) to pass through but diffusing it such that objects on the other side are not clearly visible. By "opaque" is meant having a visible light transmittance of 0%. Suitable transparent materials include plastic (e.g., polymethylmethacrylate, polycarbonate, polyurethane, polyethyleneterephthalate (PET), or copolymers of any monomers for preparing these, or mixtures thereof), ceramic, or glass. The glass can be of any type, such as but not limited to conventional float glass or flat glass, and can be of any composition having desired optical properties, e.g., any a desired value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. The ribbon is then cut and/or shaped and/or heat treated as desired. Examples of float glass processes are disclosed in U.S. Pat. Nos. 4,466,562 and 4,671,155. The glass can be, for example, conventional soda-lime-silicate glass,borosilicate glass, or leaded glass. The glass can be "clear glass", i.e., non-tinted or non-colored glass. Alternatively, the glass can be tinted or otherwise colored glass. The glass can be untempered, heat treated, or heat strengthened glass. As used herein, the term "heat strengthened" means annealed, tempered, or at least partially tempered. Although not limiting to the invention, examples of glass suitable for the substrate 12 are described in U.S. Pat. Nos. 4,746,347; 4,792,536; 5,240,886; 5,385,872; and 5,393,593, which are herein incorporated by reference. If desired, the glass can also include a coating that reflects and/or absorbs selected energy wavelengths of a type well known in the art. In addition, the substrate can be one ply of a multilayer laminate structure of a type well know in the art. The substrate 12 can be of any desired dimensions, e.g., length, width, shape, or thickness. For conventional automotive transparencies, the substrate 12 can be up to 10 mm thick, e.g., 1 mm to 10 mm thick, e.g., less than 10 mm thick, e.g., 1 mm to 5 mm thick, e.g., 1.5 mm to 2.5 mm, e.g., 1.6 mm to 2.3 mm.

Figure 4:
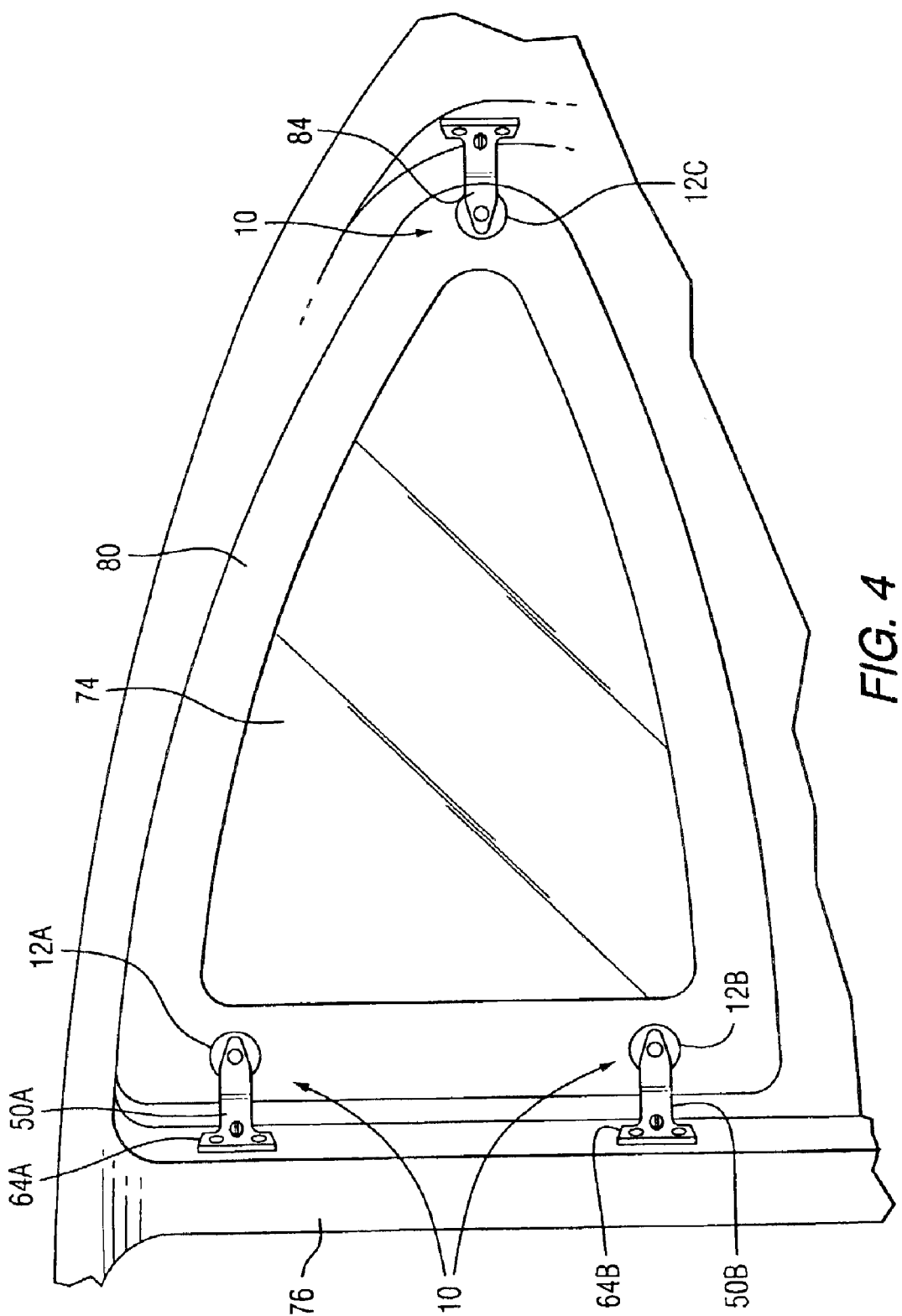
FIG. 4 is an elevational view (not to scale) of a vehicle panel attached to a vehicle by mounting assemblies incorporating features of the invention.

In FIGS. 1 and 4, the substrate is illustrated as a vehicle panel 74, such as a sidelight or rear light, mounted to a vehicle body 76 by mounting assemblies 10 of the invention.

In FIG. 1, the mounting member 12 is attached to the vehicle panel 74 by an adhesive 78. The adhesive 78 can be of any conventional type, such as but not limited to thermoplastic or theremost adhesives. For example, the adhesive 78 can be a urethane adhesive, such as a moisture activated urethane, a silicone containing adhesive, a chemically activated adhesive, or a thermally cured adhesive, just to name a few. The adhesive can be a flexible adhesive or a rigid adhesive. As used herein, the term "flexible adhesive" means an adhesive having a Young's modulus of less than or equal to 1000 psi (70 kg/sq. cm) at 23° C. and 50% relative humidity, e.g., less than or equal to 700 psi (49 kg/sq. cm), e.g., less than or equal to 500 psi (35 kg/sq. cm), e.g., less than or equal to 200 psi (14 kg/sq. cm). The term "rigid adhesive" means an adhesive having a Young's modulus of greater than 1000 psi (70 kg/sq. cm) at 23° C. and 50% relative humidity, e.g., greater than or equal to 5,000 psi (350 kg/sq. cm), e.g., greater than or equal to 8,000 psi (560 kg/sq. cm), e.g., greater than or equal to 10,000 psi (700 kg/sq. cm), e.g., greater than or equal to 14,000 psi (980 kg/sq. cm).

The mounting member 12 can be attached by the adhesive 78 directly onto the surface of the vehicle panel 74 or onto one or more coating layers or coated areas deposited over the vehicle panel 74. For example, the vehicle panel 74 can include a conventional colored frit layer, such as a ceramic band 80, extending at least partly around the periphery of the vehicle panel 74. Although not required, the band can be a leaded or unleaded ceramic enamel paint of a type well know to those skilled in the art. Although not required, the mounting member 12 can be adhesively bonded to the vehicle panel 74 in the region of the ceramic band 80 so that the mounting member 12 is not visible by persons outside of the vehicle. In another nonlimiting embodiment of the invention, at least a portion of panel 74 is covered with a transparent coating of a type well known to those skilled in the art and member 12 is bonded to the coating. Such coatings typically affect the color and/or solar properties of the coated substrate. With reference to FIG. 1 and the left side of FIG. 4, the adhesive 78 can be applied to a desired thickness adjacent the central portion 22 of the mounting member 12. The peripheral edges 82 of the adhesive 78 extend into the shoulder region 38 such that the thickness of the adhesive 78 in the shoulder region (i.e., the thickness of the adhesive 78 between the panel 74 and surfaces 26 and 40) is greater in the shoulder region 38 than the thickness of the adhesive between panel 74 and surface 30 of the central portion 22. This feature is believed to reduce the stresses in the adhesive about the perimeter of the mounting member 12. More particularly, when a force is applied to the mounting member 12 which is normal to the panel 74, the stress developed in the adhesive at the periphery of the member 12 is greater than the stresses developed in the adhesive under the central portion of member 12 due to the Poisson's effect (i.e., when a material is pulled in one direction, the body of the material will deform and pull inwardly in a direction normal to the direction of the pulling force). By increasing the thickness of the adhesive 78 near the periphery of the mounting member 12 via shoulder 38, the strain in the adhesive, and therefore the accompanying stress, about the periphery of member 12 is reduced. Although not required, in the embodiment shown in FIGS. 1–4, the adhesive 78 can be a rigid adhesive.

In the particular nonlimiting embodiment shown in FIG. 4, two mounting members 12A and 12B are attached to the left side of the vehicle panel 74 by an adhesive. Each mounting member 12A and 12B has a hinge member 50A and 50B, respectively, attached thereto, such as by a threaded bolt engaging a threaded bore in the mounting member 12. The mounting plates 64A and 64B at the second ends 56 of the respective hinge members 50A and 50B are attached to the interior structure of the vehicle in any conventional manner, e.g. by bolts or screws. As shown on the right side of FIG. 4, another mounting member 12C is mounted on the right side of the vehicle panel 74 and is attached to an articulated or extensible member 84, which is also attached to the interior of the vehicle in any conventional manner. Such extensible members 84 are well known to one of ordinary skill in the automotive art and will not be described in detail. In operation, when the vehicle panel 74 is to be opened, the extensible member 84 is opened or extended such that the vehicle panel 74 pivots on the hinge members 50A and 50B, i.e. pivots around the second ends 56 of the hinge members 50A and 50B secured to the vehicle.

Figure 5:
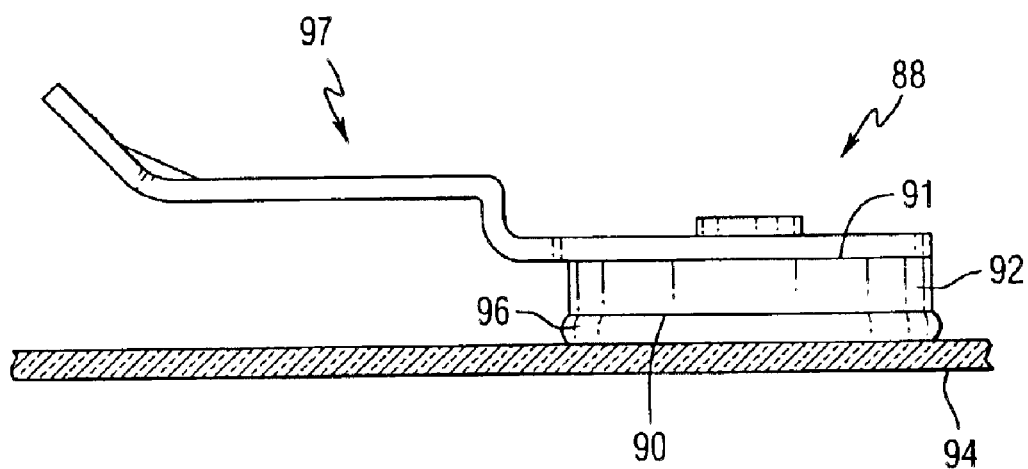
FIG. 5 is a side view (not to scale) of another vehicle panel mounting assembly of the invention.

FIG. 5 shows another nonlimiting embodiment of a mounting assembly of the present invention. In this nonlimiting embodiment, a mounting member 92 of a mounting assembly 88 includes a substantially planar or flat mounting surface 90 and opposing securing surface 91 and does not include a raised central portion as in the mounting member 12 described above. The mounting member 92 can be of any dimensions and shape when viewed in plan view. In the embodiment shown in FIG. 5, mounting member 92 has a substantially curved outer periphery devoid of corners or sharp angles when viewed in plan view. In one nonlimiting embodiment of the invention, surfaces 90 and 91 have the same shape and dimensions, and thus the same area. In another nonlimiting embodiment, member 92 is cylindrical in shape. The surface 90 can be attached to the vehicle panel 94 by an adhesive layer 96, which can be a flexible or rigid adhesive. Hinge 97, which is similar to hinge 50 discussed earlier, is attached to member 92 in any convenient manner.

Figure 6:
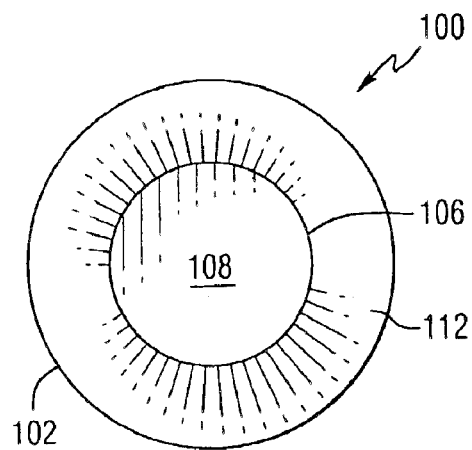
FIG. 6 is a bottom view (not to scale) similar to FIG. 2 of an alternate embodiment of a mounting member incorporating features of the present invention.
Figure 7:
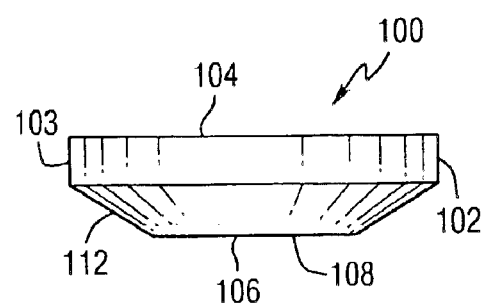
FIG. 7 is a side view (not to scale) of the mounting member shown in FIG. 6.

FIGS. 6 and 7 disclose another nonlimiting embodiment of a mounting member for a mounting assembly of the present invention. In this embodiment, mounting member 100 is similar to mounting member 12 discussed above except that member 100 does not include a shoulder region 38 having a flat surface 26 as discussed earlier in connection with member 12. More specifically, member 100 includes a base 102 having a mounting surface 104 and an extended central portion 106 with a securing surface 108 spaced from base 102, wherein the area of surface 108 is less than the cross-sectional area of base 102 along surface 104. Base 102 and central portion 106 can be of any shape or configuration. In the nonlimiting embodiment shown in FIGS. 6 and 7, base 102 is cylindrical and central portion 106 is a truncated conical section with the diameter of the base 102 being the same as the diameter of the base of portion 106, i.e. where base 102 meets portion 106, and the diameter of surface 108 being less than the diameter of base 102. Mounting member 100 further includes a shoulder portion 112 having a continuous surface 110 that transitions between the periphery 103 of base 102 and surface 108 of central portion 106. Surface 110 is similar in shape and configuration to surface 40 of shoulder portion 38 of mounting member 12 discussed earlier. In the nonlimiting embodiment shown in FIG. 6, surface 110 is tapered at an angle A of 30° to 90°, for example 45°.

Figure 10A:
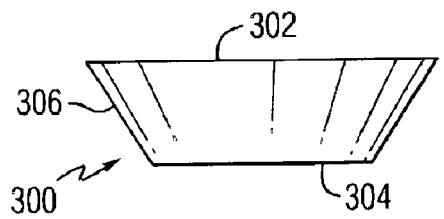
FIGS. 10A–G are side views of several nonlimiting alternate embodiments of mounting members incorporating features of the present invention

It should be appreciated that in another nonlimiting embodiment, base 102 can be eliminated to form a mounting member 300 (see FIG. 10A) having opposing, spaced apart surfaces 302 and 304, with one surface having an area greater than the other, and a shoulder portion surface 306 extending between the surfaces. In such an embodiment, wherein the surfaces are substantially circular so as to form a truncated conical shape, a cross-section of the mounting member 300 (as shown in FIG. 10A) would be generally trapezoidal in shape.

Figure 8:
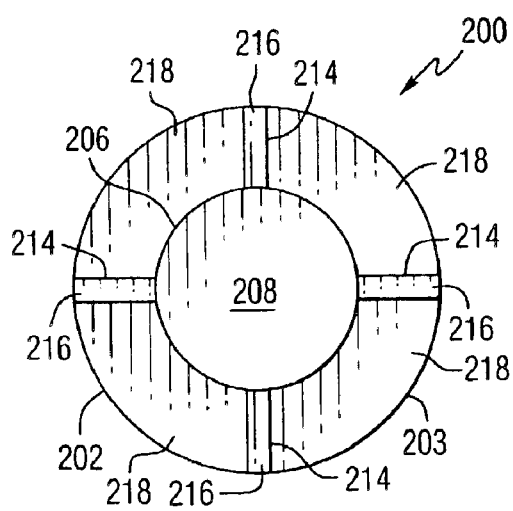
FIG. 8 is a bottom view (not to scale) similar to FIG. 2 of an alternate embodiment of a mounting member incorporating features of the present invention.
Figure 9:
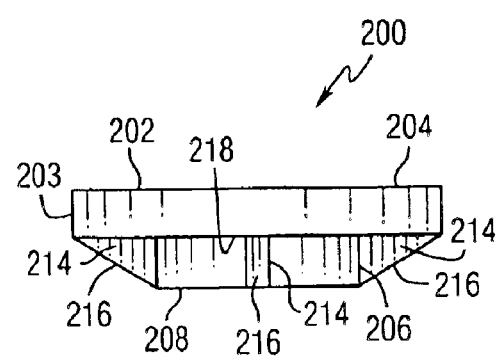
FIG. 9 is a side view (not to scale) of the mounting member shown in FIG. 8.

FIGS. 8 and 9 disclose another nonlimiting embodiment of a mounting member similar to member 100 except the transitioning surface is not continuous. More particular, member 200 includes a base 202 having a mounting surface 204 and an extended central portion 206 with a securing surface 208 spaced from base 202, and wherein the area of surface 208 is less than the cross sectional area of base 202 along surface 204. Base 202 and central portion 206 can be of any shape or configuration. In the nonlimiting embodiment shown in FIGS. 8 and 9, base 202 and extended portion 206 are both cylindrical in shape with base 202 having a diameter greater than the diameter of central portion 206. Member 200 further includes a shoulder region 212 comprising a plurality of discrete wall members 214 to transition from periphery 203 of base 202 to surface 208 of extended portion 206. Surface 216 of members 214 can be any shape or configuration. Member 200 also includes a surface 218, which extends between adjacent wall member 212 and outward of extend portion 206. In the nonlimiting embodiment shown in FIG. 6, surface 216 is inclined from base 202 to the central portion 206 at an angle A ranging from 30° to 90°, for example 45°.

If desired, the thickness of base 202 can be reduced such that base 202 is only a thin member. However, it is desired that base 202 not be completely eliminated because surface 216 provides addition surface area for the adhesive used to bond the mounting member 200 to a vehicle panel (not shown).

Figure 10B:
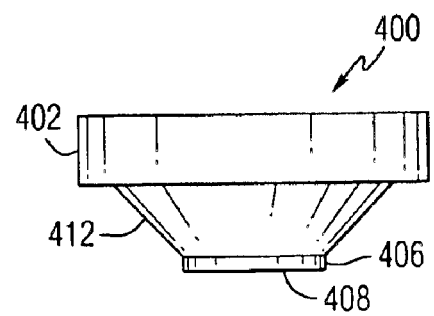
Figure 10C:
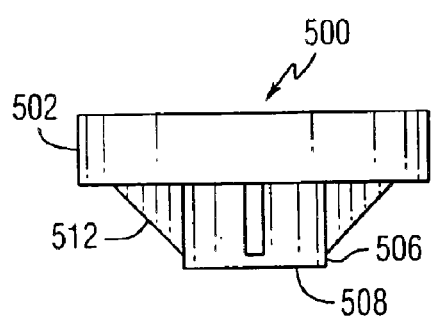
Figure 10D:
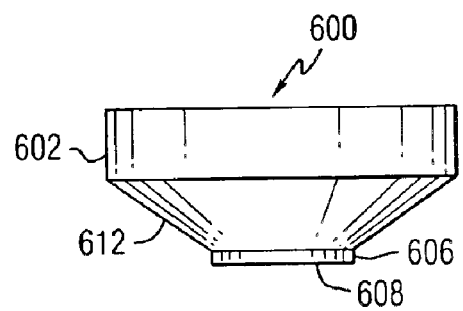
Figure 10E:
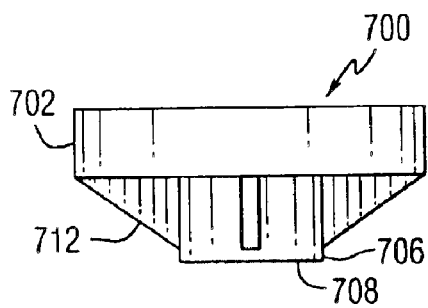

In each of the nonlimiting embodiments discussed earlier, the shoulder region extended from the securing surface of the central portion of the mounting member. However, it is contemplated that the shoulder region can end close to but spaced from this securing surface. More particularly, referring to FIG. 10, FIG. 10B illustrates a mounting member 400 similar to mounting member 12 illustrated in FIGS. 1 and 2; FIG. 10C illustrates a mounting member 500 similar to mounting member 12 illustrated in FIGS. 1 and 2 with walls W; FIG. 10D illustrates a mounting member 600 similar to mounting member illustrated in FIGS. 6 and 7; and FIG. 10E illustrates a mounting member 700 similar to mounting member 200 illustrated in FIGS. 8 and 9. In each of these nonlimiting embodiments, shoulder region 412, 512, 612 and 712 extend from base 402, 502, 602 and 702 to central portion 406, 506, 606 and 706, but do not extend all the way to securing surface 408, 508, 608 and 708, respectively, but rather ends in close proximity to the respective securing surfaces.

Figure 10F:
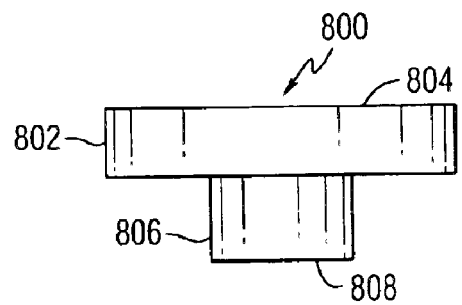
Figure 10G:
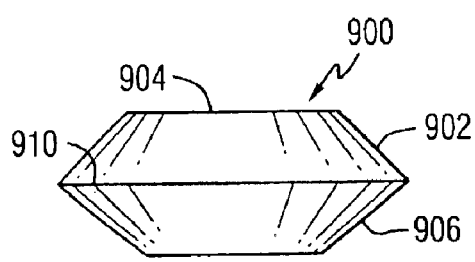

FIG. 10F illustrates a nonlimiting embodiment of a mounting member for a mounting assembly of the present invention discussed earlier. In particular, mounting member 800 includes a base 802 with mounting surface 804 and a central portion 806 extending from base 802 with a securing surface 808. The cross sectional area of base 802 along surface 804 is greater than the area of surface 808. In this particular embodiment, there is no inclined wall in the shoulder region, i.e. the wall extending from the base 802 to surface 808 of central portion 806 is at 900. Base 802 and central portion 806 can be any desired shape. In one nonlimiting embodiment, base 802 and central portion 806 are cylindrical in shape so that the wall extending from the base 802 to surface 808 of central portion 806 is the peripheral surface of central portion 806.

As stated earlier, the base of the mounting member can be any shape. In the nonlimiting embodiment illustrated in FIG. 10G, mounting member 900 includes a base 902 and central portion 906, wherein the shape of base 902 changes throughout at least a portion of its thickness. Without limiting the present invention, in this particular embodiment, both base 902 and central portion 906 are truncated conical sections with the diameter of mounting surface 904 of base being less than the diameter of the mounting member 900 at the location 910 where base 902 meets central portion 906. In another nonlimiting embodiment, the diameter of mounting surface 904 of base is greater than the diameter of the mounting member 900 at location 910.

It should be appreciated that any of the nonlimiting embodiments of a mounting member for a mounting assembly discussed earlier can be reversed so that the securing surface as discussed earlier is used as the mounting surface and the mounting surface as discussed earlier is used as the securing surface. Furthermore, in such embodiments, the area of the securing surface can be greater than the area of the mounting surface.

The following example is presented for additional illustration of features of the present invention. However, it is to be understood that the invention is not limited to the specific exemplary embodiments described in the example.

EXAMPLE

This example compares attachment parameters for a mounting member having a profiled first surface in accordance with the invention versus mounting members having flat first surfaces.

Three mounting member designs were evaluated as described below. The designs are designated as follows:

Design #1 (embodiment of FIG. 1)—a mounting member of the invention having a thickness of 7/16 inch (1.1 cm), a base diameter D3 of 1.5 inch (3.8 cm), and a central portion surface diameter D2 of 1 inch (2.5 cm). The shoulder region wall tapered from the base to the surface of the central portion at an angle of 45°.

Design #2 (embodiment of FIG. 5)—a circular mounting member having a thickness of 7/16 inch (1.1 cm) and a flat bottom surface with a diameter of 1.0 inch (2.5 cm).

Design #3 (embodiment of FIG. 5)—a circular mounting member having a thickness of 7/16 inch (1.1 cm) and a flat bottom surface with a diameter of 1.5 inch (3.8 cm).

Sample coupons of clear, tempered float glass (commercially available from PPG industries, Inc., Pittsburgh, Pa.) were coated with a layer of Ferro 24-2247 leaded black enamel, which is commercially available from Ferro Corp., Washington, Pa., in accordance with the manufacturer's instructions. Dow 435.18/20A glass primer was then applied to the enameled surface using a sponge swab. The primer was allowed to dry for a minimum of 30 seconds. Dow 435.33 metal primer was applied to the first (bottom) surface of the mounting member being examined using a sponge swab. Dow U216 (78002/79002) urethane adhesive was then applied to the bottom surface of the mounting member and the mounting member pressed against the primed surface of the glass coupon. The adhesive was applied to a thickness of 1 mm with respect to the central portion of the mounting member. The Dow primers and adhesive are commercially available from Dow Automotive, Auburn Hills, Mich. The mounting member was mechanically held in place while the adhesive set. With Design #1, during the pressing operation, adhesive from the area of the central portion flowed into the shoulder region so that the thickness adhesive in the shoulder region was greater than 1 mm. The samples were then cured in accordance with the manufacturer's suggestions for at least 48 hours.

Upon curing, the designs were evaluated for the following properties using conventional testing procedures: lap shear (ASTM D 3163-96), peel (ASTM D 1876) tensile strength, and torque. The peel and tensile tests were conducted using a commercially available Instron 1127 machine. The torque test was conducted using a torque wrench. An M8 1¼×10 steel bolt was threaded into each mounting member to provide a grip for applying a load during testing.

Tables I–IV below show the results of the testing. In the Tables, the failure mode codes are as follows: "CO" means cohesive failure (i.e. failure through the adhesive); "GB" indicates the glass broke; and "BB" indicates the bolt broke.

TABLE I (Lap Shear)

| Design # | Load (lb) [Kg] | Fail. Mode |
|---|---|---|
| 1 | 1026 [462] | CO |
| 1 | 962 [433] | CO |
| 1 | 876 [394] | GB |
| 2 | 624 [280] | CO |
| 2 | 597 [269] | CO |
| 2 | 584 [263] | CO |
| 3 | 1437 [647] | CO |
| 3 | 1426 [642] | CO |
| 3 | 1540 [693] | GB |

TABLE II (Peel)

| Design # | Load (lb) [Kg] | Fail. Mode |
|---|---|---|
| 1 | 311 [140] | CO |
| 1 | 295 [133] | CO |
| 1 | 318 [143] | CO |
| 2 | 278 [125] | CO |
| 2 | 254 [114] | CO |
| 2 | 295 [133] | CO |
| 3 | 279 [126] | GB |
| 3 | 284 [128] | GB |
| 3 | 293 [132] | GB |

TABLE III (Tensile Strength)

| Design # | Load (lb) [Kg] | Fail. Mode |
|---|---|---|
| 1 | 641 [288] | GB |
| 1 | 537 [242] | GB |
| 1 | 523 [235] | GB |
| 2 | 481 [216] | GB |
| 2 | 486 [219] | GB |
| 2 | 434 [195] | GB |
| 3 | 690 [310] | GB |
| 3 | 576 [259] | GB |
| 3 | 558 [251] | GB |

TABLE IV (Torque)

| Design # | Load (in-lb) [cm-Kg] | Fail. Mode |
|---|---|---|
| 1 | 350 [385] | BB |
| 1 | 350 [385] | BB |
| 1 | 350 [385] | BB |
| 2 | 150 [165] | CO |
| 2 | 150 [165] | CO |

TABLE IV-continued (Torque)

| Design # | Load (in-lb) [cm-Kg] | Fail. Mode |
|---|---|---|
| 2 | 150 [165] | CO |
| 3 | 350 [385] | BB |
| 3 | 350 [385] | BB |
| 3 | 350 [385] | BB |

Table V below the average values for the three designs tested.

TABLE V

| | Lap Shear (lb) [Kg] | Peel (lb) [Kg] | Tensile (lb) [Kg] | Torque (in-lb) [cm-Kg] |
|---|---|---|---|---|
| 1 | 954.7 [429] | 308 [139] | 567 [255] | 350 [385] |
| 2 | 601.7 [270] | 275.7 [124] | 467 [210] | 150 [165] |
| 3 | 1467.7 [660] | 285.3 [128] | 608 [274] | 350 [385] |

As shown from the above examples, Design 1 has a larger lap shear result than Design 2 but less than that of Design 3. However, Design 1 has a larger peel result than both Designs 2 and 3. Design 1 has a larger tensile strength result than Design 2 but slightly less than that of Design 3. Also, Design 1 does have substantially the same torque results as Design 3 and higher than that of Design 2.

It will be readily appreciated by those skilled in the art that modifications can be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A mounting assembly comprising:
   a mounting member comprising a base having a first surface facing in a first direction and an opposing side facing in a second direction opposite the first direction;
   a hinge member connected to the first surface of the base;
   a central portion extending from the opposing side of the base and having a second surface spaced from the base, the second surface configured to be adhered to a substrate and the second surface facing in the second direction; and
   a shoulder region located between the base and the central portion.

2. The assembly of claim 1, wherein the base has a substantially curved periphery when viewed in plan view.

3. The assembly of claim 2, wherein the first surface of the base is substantially flat.

4. The assembly of claim 2, wherein the first surface of the base is substantially circular in plan view.

5. The assembly of claim 4, wherein the first surface of the base has a diameter in the range of 1 inch to 2 inches.

6. The assembly of claim 1, wherein the second surface of the central portion has a substantially curved periphery when viewed in plan view.

7. The assembly of claim 6, wherein the second surface of the central portion is substantially flat.

8. The assembly of claim 6, wherein the second surface of the central portion is substantially circular in plan view.

9. The assembly of claim 8, wherein the second surface of the central portion has a diameter in the range of 0.5 to 2.5 inches.

10. The assembly of claim 1, wherein the mounting member has a thickness in the range of 0.5 inch to 1.5 inches.

11. The assembly of claim 1, wherein the base is cylindrically shaped with a substantially flat first surface, the second surface of the central portion is substantially flat and substantially circular in plan view and further is concentric with the first surface, and the shoulder region includes a wall that extends from the second surface to a location inboard of the periphery of the base.

12. The assembly of claim 1, wherein the first surface of the base has a first area and the second surface of the central portion has a second area that is less than the first area.

13. The assembly of claim 1, wherein the shoulder region includes a wall extending from at least in close proximity to the second surface of the central portion to the base.

14. The assembly of claim 13, wherein the wall of the shoulder region extends from at least in close proximity to a periphery of the base.

15. The assembly of claim 14, wherein the wall of the shoulder region extends from the second surface of the central portion to a position inboard of a periphery of the base.

16. The assembly of claim 13, wherein the wall is at an angle ranging from 30° to 90° as defined from the base to the central portion.

17. The assembly of claim 16, wherein the wall is at an angle of 45° as defined from the base to the central portion.

18. The assembly of claim 1, wherein the shoulder region is concentric with the second surface.

19. The assembly of claim 1, wherein the bases includes a connecting member having an arrangement facilitating connection of the hinge member to the mounting member.

20. The assembly of claim 1, wherein the base includes at least one hollow cavity.

21. The assembly of claim 1, wherein the shoulder region extends substantially continuously around an entire outer perimeter of the central member.

22. The assembly of claim 1, wherein the hinge member is an elongated hinge member having a first end and a second end, with the second end attached to the first surface of the mounting member.

23. The assembly of claim 22, wherein the hinge member is removably attached to the base.

24. The assembly of claim 23, wherein the second end of the hinge member is attached to the mounting member by a threaded bolt extending through the second end of the hinge member and engaging a threaded bore in the base of the mounting member.

25. A mounting assembly, comprising:
a mounting member having a base with a first surface configured to engage a hinge member and facing in a first direction and an opposing side facing in a second direction opposite the first direction, a central portion extending from the opposing side of the base and having a second surface, the second surface configured to be adhered to a substrate and the second surface facing in the second direction, and a shoulder region located between the base and the central portion; and
a hinge member having a first end and a second end, with the first end removably attached to the first surface of the mounting member.

26. The assembly of claim 25, wherein the mounting member includes a connecting member and the hinge member is removably attached to the mounting member by a connecting element configured to releaseably engage the connecting member.

27. A mounting assembly, comprising:
a mounting member having a base with a first surface, a central portion extending from the base with a second surface, and a shoulder region located between the base and the central portion;
a hinge member having a first end and a second end, with the first end removably attached to the first surface of the mounting member; and
an adhesive along at least a portion of the second surface of the central portion.

28. The assembly of claim 27, wherein the adhesive extends along the shoulder region of the mounting member.

29. An assembly, comprising:
a substrate having a first surface and a second surface;
a mounting member secured to the first surface of the substrate, the mounting member including a base having a first surface facing away from the first surface of the substrate, a central portion extending from the base having a second surface facing the first surface of the substrate and a substantially curved periphery, and a shoulder region located between the central portion and the base; and
an adhesive providing a bond between at least a portion of the second surface of the central portion and the first surface of the substrate, the adhesive extending into at least a portion of the shoulder region such that a thickness of the adhesive in the at least a portion of shoulder region is greater than a thickness of the adhesive along at least a portion of the second surface of the central portion.

30. The assembly of claim 29, wherein the adhesive has a Young's modulus of greater than 1000 psi.

31. The assembly of claim 29, wherein the adhesive has a Young's modulus of up to 1000 psi.

32. The assembly of claim 29, wherein the base, the shoulder region, and the central portion are concentric.

33. The assembly of claim 29, wherein the substrate is selected from the group consisting of an architectural window, a skylight, an insulating glass unit, a vehicle panel, and an aircraft transparency.

* * * * *